US011301255B2

(12) United States Patent
Chen et al.

(10) Patent No.: US 11,301,255 B2
(45) Date of Patent: Apr. 12, 2022

(54) METHOD, APPARATUS, DEVICE, AND STORAGE MEDIUM FOR PERFORMING PROCESSING TASK

(71) Applicants: Baidu.com Times Technology (Beijing) Co., Ltd., Beijing (CN); Baidu USA LLC, Sunnyvale, CA (US)

(72) Inventors: Qingshu Chen, Shanghai (CN); Zhibiao Zhao, Cupertino, CA (US); Hefei Zhu, Sunnyvale, CA (US); Xiaozhang Gong, Shanghai (CN); Yong Wang, Shanghai (CN); Jian Ouyang, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 16/729,989

(22) Filed: Dec. 30, 2019

(65) Prior Publication Data
US 2021/0072996 A1 Mar. 11, 2021

(30) Foreign Application Priority Data
Sep. 11, 2019 (CN) .......................... 201910859334.7

(51) Int. Cl.
*G06F 3/06* (2006.01)
*G06F 9/38* (2018.01)
(Continued)

(52) U.S. Cl.
CPC .......... *G06F 9/3855* (2013.01); *G06F 9/3004* (2013.01); *G06F 9/3838* (2013.01);
(Continued)

(58) Field of Classification Search
None
See application file for complete search history.

(56) References Cited

U.S. PATENT DOCUMENTS

| 5,887,186 | A | 3/1999 | Nakanishi |
| 7,620,945 | B1 | 11/2009 | Song et al. |

(Continued)

FOREIGN PATENT DOCUMENTS

| JP | 2006048696 | 2/2006 |
| JP | 2007200295 | 8/2007 |

(Continued)

OTHER PUBLICATIONS

Perez et al., "A Dependency-Aware Task-Based Programming Environment for Multi-Core Architectures", 2008, IEEE (Year: 2008).*

(Continued)

*Primary Examiner* — Hyun Nam
(74) *Attorney, Agent, or Firm* — Knobbe, Martens, Olson & Bear LLP

(57) ABSTRACT

Methods, apparatuses, devices, and storage media for performing a processing task are provided. A portion of portions of the processing task can include a group of operations that are to be performed at a processing unit of processing units. The group of operations can include operations of a first type and operations of a second type. In the method, a first queue for performing the operations of the first type and a second queue for performing the operations of the second type can be built, respectively. Based on a definition of the processing task, a dependency relationship between a group of operations to be performed at the processing unit and a group of operations to be performed at other processing units in the plurality of processing units can be obtained. Operations in the first queue and operations in the second queue can be performed respectively based on the dependency relationship.

18 Claims, 10 Drawing Sheets

(51) Int. Cl.
*G06F 9/30* (2018.01)
*G06F 9/48* (2006.01)
*G06F 9/54* (2006.01)

(52) U.S. Cl.
CPC .......... *G06F 9/3885* (2013.01); *G06F 9/4812* (2013.01); *G06F 9/542* (2013.01)

(56) References Cited

U.S. PATENT DOCUMENTS

| | | | | |
|---|---|---|---|---|
| 2004/0139299 | A1* | 7/2004 | Busaba | G06F 9/3838 712/218 |
| 2008/0270749 | A1* | 10/2008 | Ozer | G06F 9/3838 712/23 |
| 2010/0131955 | A1* | 5/2010 | Brent | G06F 9/4843 718/103 |
| 2011/0276966 | A1* | 11/2011 | Christensen | G06F 9/5038 718/100 |
| 2012/0066692 | A1 | 3/2012 | Jia | |
| 2012/0179881 | A1 | 7/2012 | Archer et al. | |
| 2013/0060981 | A1* | 3/2013 | Horn | G06F 3/0659 710/107 |
| 2014/0101673 | A1* | 4/2014 | Klyuchevskyy | G06F 9/4881 718/106 |
| 2016/0109922 | A1* | 4/2016 | Chen | G06F 1/3287 713/322 |
| 2018/0088989 | A1* | 3/2018 | Nield | G06F 9/4893 |
| 2020/0310815 | A1* | 10/2020 | Ayupov | G06F 9/3814 |
| 2021/0011782 | A1* | 1/2021 | Shil | G06F 9/45558 |

FOREIGN PATENT DOCUMENTS

| | | |
|---|---|---|
| JP | 2010287255 A | 12/2010 |
| JP | 2016537717 | 12/2016 |
| JP | 6197791 B2 | 9/2017 |
| KR | 101676467 61 | 11/2016 |

OTHER PUBLICATIONS

Fujitsu Software Interstage Big Data Parallel Processing Srever V1.2.2. 368 pages.

Japanese Office Action dated Jan. 18, 2022 for Japanese Patent Application No. 2019-238897. 2 pages.

\* cited by examiner

METHOD, APPARATUS, DEVICE, AND STORAGE MEDIUM FOR PERFORMING PROCESSING TASK

CROSS-REFERENCE TO RELATED APPLICATIONS

This application claims priority to Chinese Patent Application No. 201910859334.7, filed on Sep. 11, 2019, titled "Method, Apparatus, Device, and Storage Medium for Performing Processing Task," which is hereby incorporated by reference in its entirety.

FIELD

Implementations of the present disclosure generally relate to processing tasks, and more specifically, to methods, apparatuses, devices, and storage media for performing a processing task in multiple processing units in a distributed way.

BACKGROUND

With the development of computer technologies, distributed processing has emerged. Multiple processing units may be provided, and a processing task may be performed in the multiple processing units in a distributed way. However, as processing tasks get increasingly complex, a great number of processing units are needed to coordinate operations. At this point, it becomes a technical challenge regarding how to schedule multiple processing units to perform a processing task more effectively.

SUMMARY

According to example implementations of the present disclosure, there is provided a solution for performing a processing task.

In a first aspect of the present disclosure, there is provided a method for performing a processing task. A portion of a plurality of portions of the processing task includes a group of operations that are to be performed at a processing unit of a plurality of processing units, and the group of operations include operations of a first type and operations of a second type. In the method, a first queue for performing the operations of the first type and a second queue for performing the operations of the second type are built, respectively. Based on a definition of the processing task, a dependency relationship between a group of operations that are to be performed at the processing unit and a group of operations that are to be performed at other processing units among the plurality of processing units is obtained. Operations in the first queue and operations in the second queue are performed respectively based on the dependency relationship.

In a second aspect of the present disclosure, there is provided an apparatus for performing a processing task. A portion of a plurality of portions of the processing task includes a group of operations that are to be performed at a processing unit of a plurality of processing units, and the group of operations include operations of a first type and operations of a second type. The apparatus includes: a building module configured to build a first queue for performing the operations of the first type and a second queue for performing the operations of the second type respectively; an obtaining module configured to obtain a dependency relationship between a group of operations that are to be performed at the processing unit and a group of operations that are to be performed at other processing units among the plurality of processing units based on a definition of the processing task; and a performing module configured to perform operations in the first queue and operations in the second queue respectively based on the dependency relationship.

In a third aspect of the present disclosure, there is provided a device for performing a processing task. The device includes: one or more processors; and a storage device for storing one or more programs which, when executed by the one or more processors, cause the one or more processors to implement a method according to the first aspect of the present disclosure.

In a fourth aspect of the present disclosure, there is provided a computer readable storage medium having a computer program stored thereon. The program, when executed by a processor, implementing a method according to the first aspect of the present disclosure.

It should be understood contents described in the Summary section are not intended to limit key features or essential features of the present disclosure, nor are they intended to be used to limit the scope of the present disclosure. Other features of the present disclosure will become easier to understand from the description below.

BRIEF DESCRIPTION OF THE DRAWINGS

With reference to the detailed descriptions below in conjunction with the accompanying drawings, the above and other features, advantages and aspects of the implementations of the present disclosure will become more apparent. In the drawings, the same or similar reference numerals represent the same or similar elements, where.

DETAILED DESCRIPTION OF IMPLEMENTATIONS

The implementations of the present disclosure will be described in more details with reference to the drawings. Although the drawings illustrate some implementations of the present disclosure, it should be appreciated that the present disclosure can be implemented in various manners and should not be limited to the implementations explained herein. On the contrary, the implementations are provided to make the present disclosure more thorough and complete. It should be understood the drawings and implementations disclosed herein are merely for the illustration purpose and not intended to limit the protection scope of the present disclosure.

As used herein, the term "includes" and its variants are to be read as open-ended terms that mean "includes, but is not limited to." The term "based on" is to be read as "based at least in part on." The term "one implementation" or "the implementation" is to be read as "at least one example implementation." The terms "first", "second" and so on can refer to same or different objects. The following text also can include other explicit and implicit definitions.

In the context of some embodiments of the present disclosure, the processing task may be an AllReduce task, which is used for performing accumulator operations on to-be-processed data. The processing task may be performed at multiple processing units (e.g. GPU, AI-specific chips, etc.). For example, the number of multiple processing units may be denoted as n. For the sake of description, an example of performing the processing task at 4 processing units will be cited by way of explanation in the context of the present disclosure. It will be understood the value of n may further be a larger or smaller integer.

There have been provided varieties of technical solutions for AllReduce operations. In a ring-based AllReduce solution, to-be-processed data may be divided into n portions, and the n portions may be respectively processed at n processing units which are connected in a ring. Each processing unit transmits its accumulated result to the next processing unit and receives an accumulated result from the last processing unit in the ring.

Figure 1A:
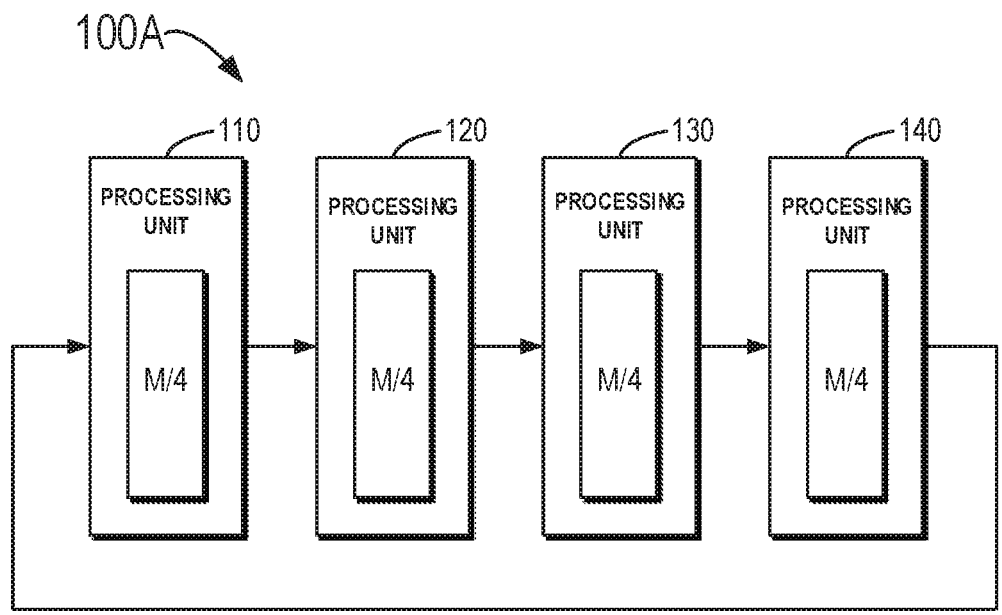
FIG. 1A schematically shows a block diagram of performing a processing task by multiple processing units.

First of all, description is presented below to an application environment of some embodiments of the present disclosure with reference to FIGS. 1A and 1B. FIG. 1A schematically shows a block diagram 100A of performing a processing task by multiple processing units. As depicted, 4 processing units 110, 120, 130 and 140 connected in a ring are used to perform the processing task. Here to-be-processed data is assumed as M. Data M may be divided into 4 portions, as such each data portion is M/4. Respective to-be-processed M/4 of the to-be-processed data is sent to each processing unit.

Data of each processing unit is evenly divided into 4 portions, and the $i^{th}$ processing unit copies the $i^{th}$ data to a subsequent processing unit. Each processing unit accumulates data received from the previous processing unit with local corresponding data and copies an accumulated result to the subsequent processing unit. In the next round, each processing unit waits for an accumulated result from the previous processing unit, accumulates the received accumulated result with local corresponding data and copies a new accumulated result to the subsequent processing unit. The above steps are repeated, until each processing unit has its own portion of complete accumulated result. Subsequently, each processing unit copies its own portion of complete accumulated result to the subsequent processing unit, and the subsequent processing unit then copies this portion of complete accumulated result to a further subsequent processing unit after receiving it, until each processing unit has the entire complete accumulated result.

Figure 1B:
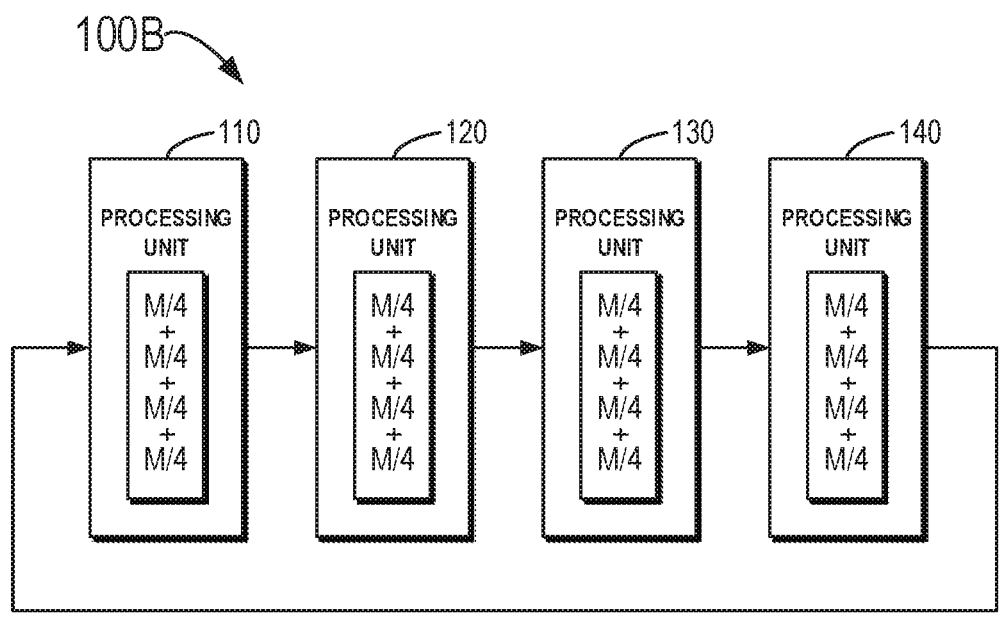
FIG. 1B schematically shows a block diagram of a processing result of performing a processing task by multiple processing units.

FIG. 1B schematically shows a block diagram of a processing result after multiple processing units perform the processing task. After performing the above described AllReduce task, each of the processing units 110, 120, 130 and 140 has the entire complete accumulated result. In order to control n processing units to coordinate in the above described procedure, enormous communication resources are needed to schedule data accumulating, copying and receiving, so the scalability is rather poor.

There is further provided a bidirectional ring-based AllReduce solution, in which multiple processing units are divided into horizontal and vertical rings. However, steps of the solution require larger communication overheads, so the solution can hardly be applied in massive data processing. Therefore, it is desirable to provide a more effective approach to implement AllReduce processing tasks.

In order to at least partly solve the drawbacks in the above technical solutions, according to example implementations of the present disclosure, there is provided a technical solution for performing a processing task. Specifically, example implementations of the present disclosure propose the concept of operation queue, and at a processing unit, corresponding operation queues may be built for different types of operations. Subsequently, operations in various operation queues may be performed at the processing unit respectively based on a dependency relationship between multiple operations that are to be performed at the processing unit and multiple operations that are to be performed at other processing units, so as to accomplish a portion of the processing task which is allocated to the processing unit. A brief description is presented below to the procedure of some embodiments of the present disclosure with reference to FIG. 2.

Figure 2:
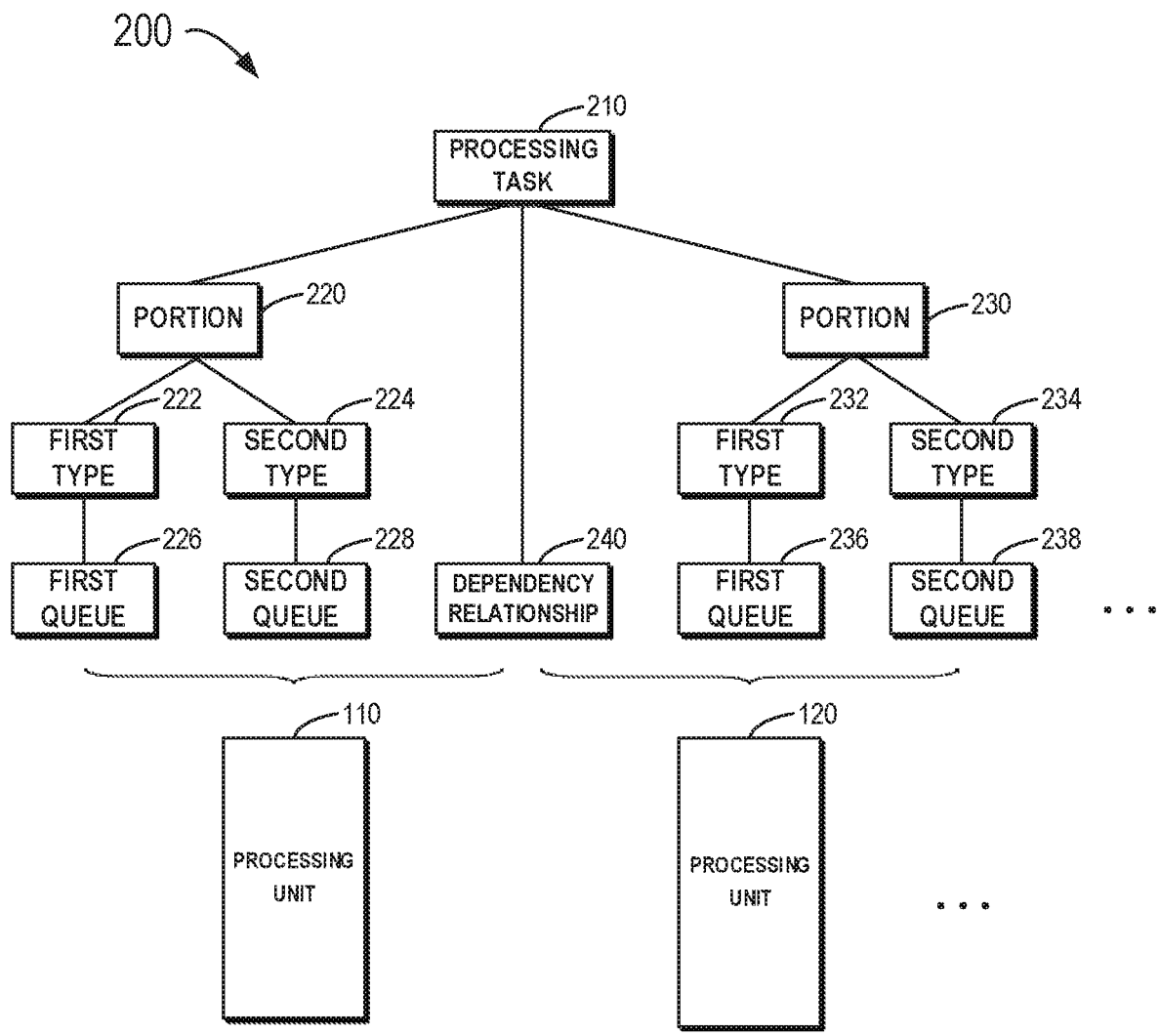
FIG. 2 schematically shows a block diagram for performing a processing task according to example implementations of the present disclosure.

FIG. 2 schematically shows a block diagram 200 for performing a processing task according to example implementations of the present disclosure. For the sake of description, FIG. 2 merely illustrates the processing performed at two of multiple processing units. When a group of processing units include n processing units, a processing task 210 may be divided into n portions. As shown in FIG. 2, the processing task 210 may include multiple portions 220, 230, etc., and one portion of the processing task 210 may be processed by one processing unit. For example, the portion 220 may be processed by the processing unit 110, the portion 230 may be processed by the processing unit 120. For the sake of description, the processing unit 110 processing the portion 220 is taken by way of example below, and the processing unit 120 processing the portion 230 involves a similar procedure.

Here each portion includes operations of a first type and operations of a second type. For example, the portion 220 may include operations of a first type 222 and operations of a second type 224. At the processing unit 110, a first queue 226 for performing operations of the first type 222 and a second queue 228 for performing operations of the second type 224 may be built. Depending on the type of the operations, here the operations may be sorted in an order of execution in a corresponding queue.

Subsequently, based on a definition of the processing task 210, a dependency relationship 240 between a group of operations that are to be performed at the processing unit 110 and a group of operations that are to be performed at other processing unit 120 in the multiple processing units may be obtained. The dependency relationship here refers to an order for performing the operations. For example, regarding operations to be performed at the processing unit 110, a copy operation of copying a data block to a subsequent processing unit may not depend on any other operations, but an accumulation operation depends on a previous processing unit already copying a data block to the processing unit 110. Having obtained the dependency relationship 240, operations in the first queue 226 and operations in the second queue 228 may be performed respectively at the processing unit 110 based on the dependency relationship 240.

Similarly, for the processing unit 120, the portion 230 allocated to the processing unit 120 may include operations of a first type 232 and operations of a second type 234, and a first queue 236 and a second queue 238 may be built respectively so as to manage various types of operations. Subsequently, operations in the first queue 236 and operations in the second queue 238 may be performed respectively based on the dependency relationship 240. With the technical solution of some embodiments of the present disclosure, by scheduling the execution of different types of operations based on queues and the dependency relationship, the AllReduce parallelism may be significantly increased, and various time and resource overheads during execution may be reduced. Further, the technical solution of some embodiments of the present disclosure may be combined with existing AllReduce methods.

Figure 3:
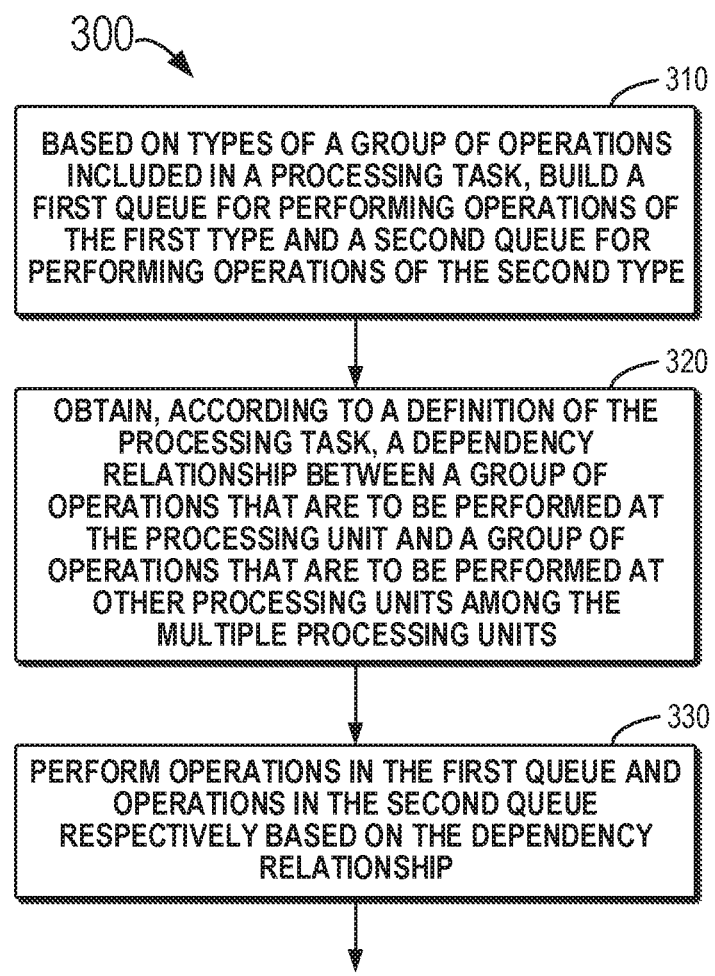
FIG. 3 schematically shows a flowchart of a method for performing a processing task according to example implementations of the present disclosure.

With reference to FIG. 3, description is presented below to more details about example implementations of the present disclosure. FIG. 3 schematically shows a flowchart of a method 300 for performing a processing task according to example implementations of the present disclosure. Here, the portion 220 of the processing task 210 will be performed at the processing unit 110. At block 310, a first queue for performing operations of a first type and a second queue for performing operations of a second type may be built at a processing unit.

According to example implementations of the present disclosure, the processing task 210 may be an AllReduce task, and multiple processing units are connected in a ring. For example, the multiple processing units 110, 120, 130 and 140 may be connected successively in a ring as shown in FIG. 1A. For another example, the multiple processing units may be divided into horizontal and vertical directions and multiple processing units are connected in each of rings in the two directions.

It will be understood to-be-processed data which is to be processed by the processing task 210 may be divided into multiple data blocks. Suppose the processing task 210 is to be performed by n processing units, then the to-be-processed data may be divided into n data blocks, and a corresponding data block may be sent to each processing unit. In this case, each processing unit may receive one data block, and this data block is a portion of the to-be-processed data of the processing task 210, which is to be processed at the processing unit.

Figure 4:
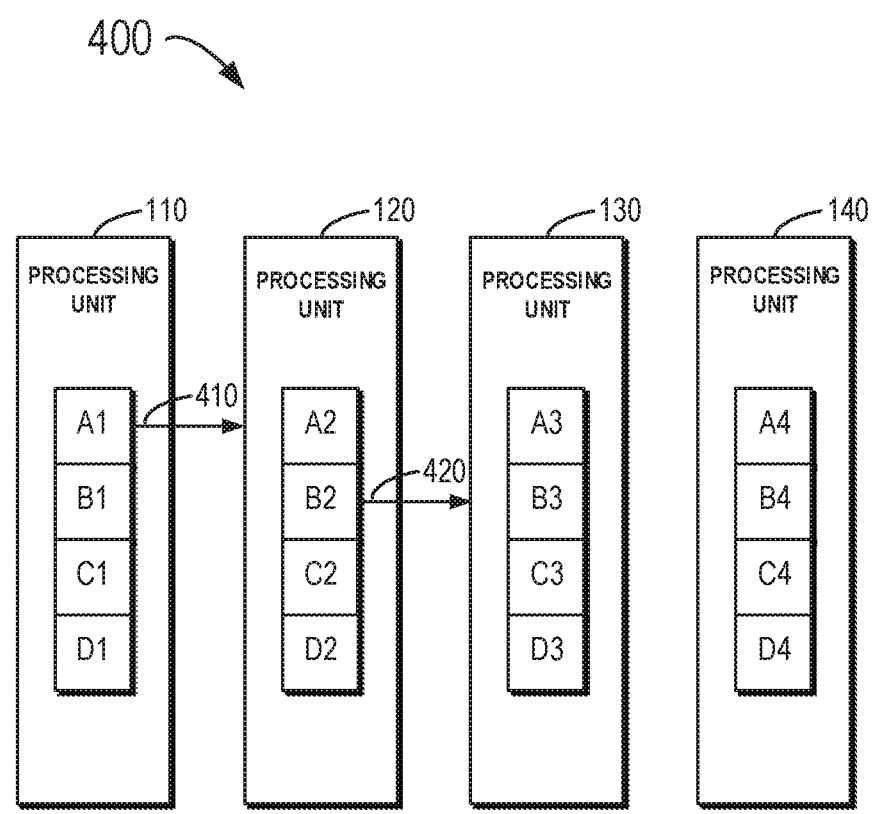
FIG. 4 schematically shows a block diagram of data distribution among multiple processing units according to example implementations of the present disclosure.

For the sake of description, the entire to-be-processed data is assumed as M. In a case where 4 processing units are used, the to-be-processed data may be divided into 4 data blocks. In this case, to-be-processed data blocks may be sent to the processing units 110, 120, 130 and 140 respectively. At each processing unit, received data may be divided into 4 portions. In this case, the divided data may include data A1, B1, C1 and D1 at the processing unit 110; the divided data may include data A2, B2, C2 and D2 at the processing unit 120, and so on and so forth. Description is presented below to an example of operations at each processing unit. FIG. 4 schematically shows a block diagram 400 of data distribution among the multiple processing units according to example implementations of the present disclosure. For example, Table 1 below shows an example of operations performed at the processing unit 120, and when performing the operations, the processing unit 120 already has the data A2, B2, C2 and D2.

TABLE 1

Example Operations at Processing unit

| Operation ID | Operation Type | Operation Content |
| --- | --- | --- |
| Operation 1 | Copy operation | Copy data block B2 at the processing unit 120 to the processing unit 130 |
| Operation 2 | Accumulation operation | Accumulate data block A1 received from the processing unit 110 and local data block A2 so as to obtain an accumulated result (A1 + A2) |
| Operation 3 | Copy operation | Copy the accumulated result (A1 + A2) to the processing unit 130 |
| Operation 4 | Accumulation operation | . . . |
| . . . | . . . | . . . |

As shown in Table 1, the first column lists identifiers of operations, the second column lists types of operations, and the third column lists contents of operations. Table 1 merely illustrates a part of operations to be performed at the processing unit 120, and after operation 2, accumulation operations and copy operations may be performed alternatively until an accumulated result (A1+A2+A3+A4) is obtained. It will be understood the accumulated result (A1+A2+A3+A4) here is merely a partial complete accumulated result. Thus, each processing unit needs to copy its local partial complete accumulated result to the next processing unit, and then the next processing unit performs copy circularly, until each processing unit has the entire complete accumulated result.

The group of operations to be performed at the processing unit 120 may include copy operations and accumulation operations. In this case, a first queue and a second queue may be built respectively based on types of operations to be performed at the processing unit 120. Specifically, the first queue may include accumulation operations as shown in Table 2 below, and the second queue may include copy operations as shown in Table 3 below.

TABLE 2

Example of Accumulation Queue

Operation 2
Operation 4
. . .

TABLE 3

Example of Copy Queue

Operation 1
Operation 3
. . .

Figure 5:
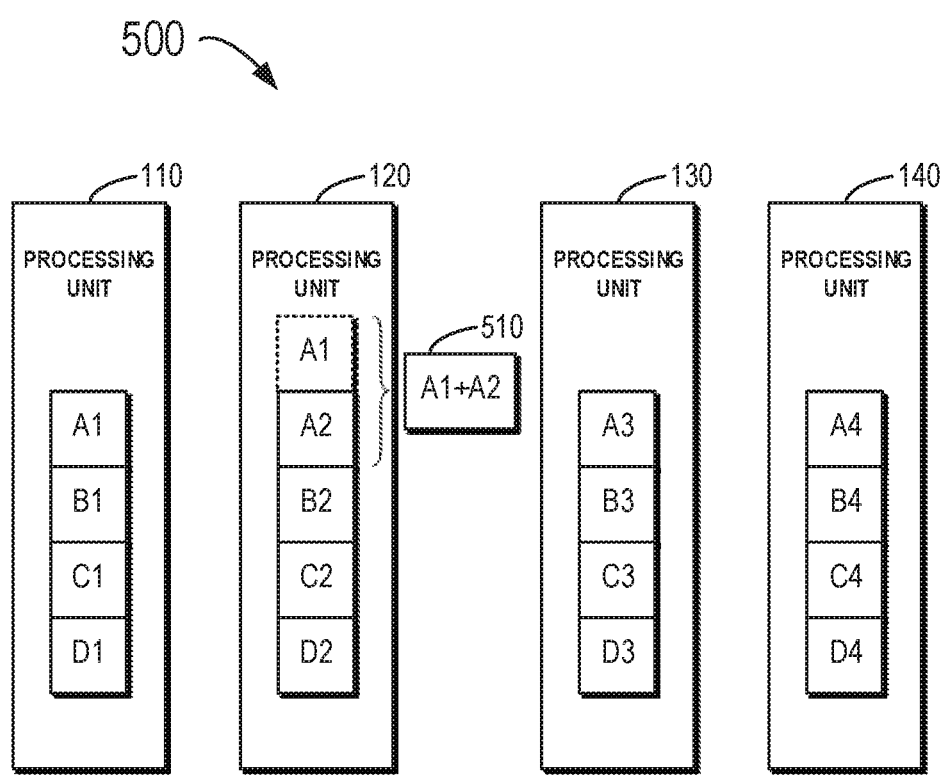
FIG. 5 schematically shows a block diagram for performing an accumulation operation at multiple processing units according to example implementations of the present disclosure.

More details about copy operations and accumulation will be described with reference to FIGS. 4 and 5. It will be understood the copy operation here may copy an accumulated result/data block at a processing unit to a subsequent processing unit which is connected to and arranged after the processing unit. For the processing unit 10, as shown by an arrow 410, the processing unit 110 may copy data A1 to the processing unit 120 to form a duplicate. For the processing unit 120, as shown by an arrow 420, the processing unit 120 may copy data B2 to the processing unit 130 to form a duplicate. Similar copy operations may be performed at other processing units. Though not shown in FIG. 4, the object of the copy operation may further be an accumulated result at a processing unit.

According to example implementations of the present disclosure, an accumulation operation refers to accumulating a data block at a processing unit and an accumulated result which is copied to the processing unit from a previous processing unit connected to and arranged before the processing unit, to form an accumulated result of the processing unit. FIG. 5 schematically shows a block diagram 500 for performing accumulation operations at multiple processing units according to example implementations of the present disclosure. FIG. 5 shows the state of the processing unit 120 after the copy operations in FIG. 4, and after the copy operations, the processing unit 120 already has the duplicate of data A1. At the processing unit 120, an accumulated result 510 (i.e. A1+A2) may be determined based on data A2 and the duplicated of data A1. Similarly, accumulated results of other data may further be determined at other processing units.

Figure 6:
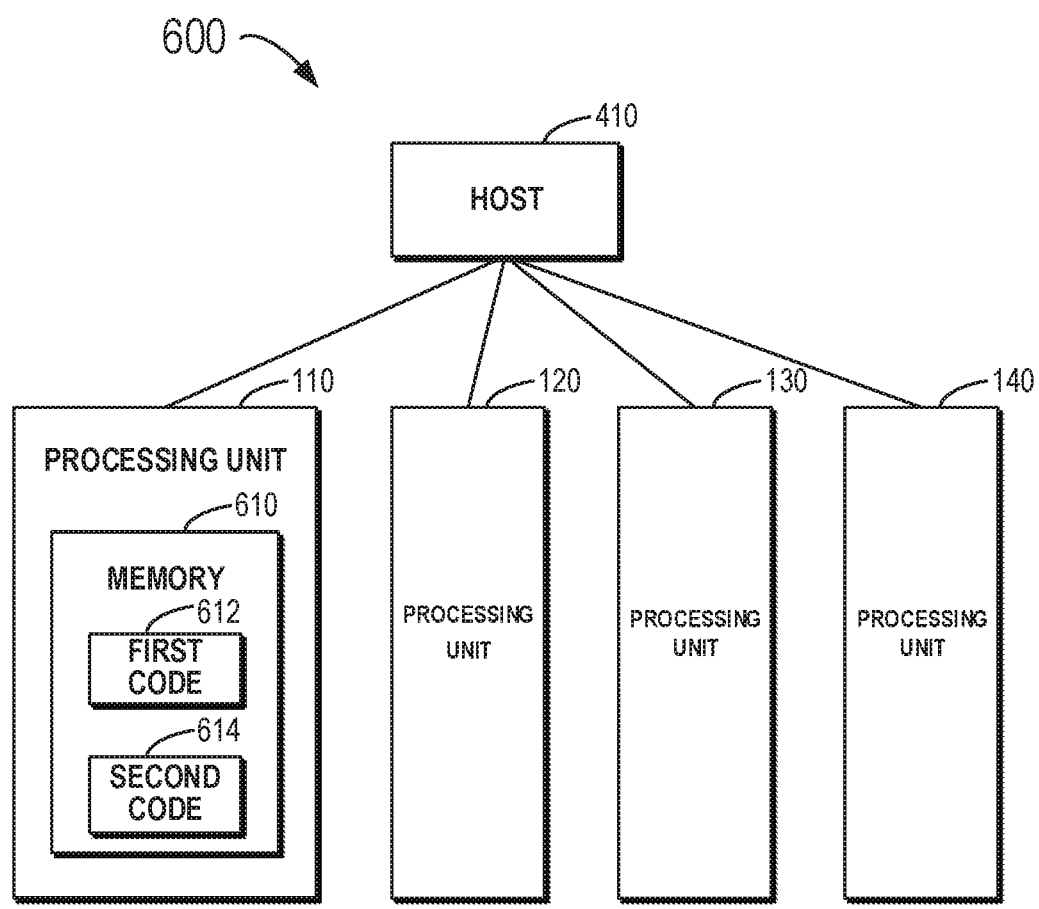
FIG. 6 schematically shows a block diagram of loading code to processing units according to example implementations of the present disclosure.

According to example implementations of the present disclosure, in order to perform copy operations and accumulation operations, code for executing a corresponding type of operation may be loaded to a processing unit. FIG. 6 schematically shows a block diagram 600 for loading code to a processing unit according to example implementations of the present disclosure. As depicted, a host 410 may be connected to the processing units 110, 120, 130 and 140. Here the host 410 may load first code for performing operations of accumulation type and second code for performing operations of copy type to memories of various processing units.

It will be understood the procedure of loading code to each processing unit is quite similar. For the sake of simplicity, description is presented below to only the loading procedure for the processing unit 110. According to example implementations of the present disclosure, first code 612 for performing accumulation operations and second code 614 for performing copy operations may be respectively loaded to a memory 610 of the processing unit 110.

After the first code 612 and the second code 614 are loaded to the memory 610, the processing unit 110 may perform operations corresponding to the code rapidly. According to example implementations of the present disclosure, in order to increase the response speed of the processing unit 110, at least one of the first code 612 and the second code 614 may be retained in the memory 610 of the processing unit 110. With example implementations of the present disclosure, code for data copy and data accumulation is preloaded to various processing units and resides in memories of various processing units, so that extra time and resource overheads caused by repetitive loading/releasing may be avoided.

In this case, operations in the first queue may be performed based on the first code 612, and operations in the second queue may be performed based on the second code 614. It will be understood since copy operations take bandwidth resources between processing units, and accumulation operations take computing resources in the processing units, regarding some operations without a dependency relationship, operations in the two queues may be performed in parallel.

At block 320, a dependency relationship between multiple operations may be determined according to a definition of the processing task 210. A dependency relationship between a group of operations that are to be performed at the processing unit 110 and a group of operations that are to be performed at other processing units in the multiple processing units may be obtained. Description on how to obtain the dependency relationship is presented below by taking multiple operations to be performed at the processing unit 120 as an example. Continuing the above example, it is assumed that 4 data blocks are already transmitted to the processing units 110, 120, 130 and 140. It may be determined from the AllReduce procedure that the dependency relationship between operations is as shown in the last column of Table 4.

TABLE 4

Example of Dependency Relationship

| Operation ID | Operation Type | Operation Content | Dependency Relationship |
|---|---|---|---|
| Operation 1 | Copy operation | Copy data block B2 at the processing unit 120 to the processing unit 130. | The copy operation does not depend on other operations. |
| Operation 2 | Accumulation operation | Accumulate data block A1 received from the processing unit 110 and local data block A2 so as to obtain an accumulated result (A1 + A2). | The accumulation operation depends on the processing unit 110 copying the data block A1 to the processing unit 120, and operation 1 has no dependency relationship with operation 2. |
| Operation 3 | Copy operation | Copy the accumulated result (A1 + A2) to the processing unit 130. | The copy operation depends on the completion of operation 2. |
| Operation 4 | Accumulation operation | . . . | . . . |
| . . . | . . . | . . . | . . . |

Returning to FIG. 3, at block 330, operations in the first queue and operations in the second queue are performed respectively based on the dependency relationship. It will be understood that a hardware interrupt may be used to notify a processing unit that the dependency relationship for performing a certain specific operation is satisfied, and further the processing unit may be triggered to perform the specific operation. According to example implementations of the present disclosure, if it is determined that an operation in either of the first queue and the second queue is completed at a processing unit, and then a hardware interrupt of the processing unit is used to notify other processing units.

With example implementations of the present disclosure, tasks in a queue are scheduled based on a hardware interrupt of a processing unit, so that the processing unit itself guarantees the sequence for performing tasks, and unnecessary communication with the host is avoided. With the technical solution of some embodiments of the present disclosure, the AllReduce parallel efficiency may be increased significantly, and various time and resource overheads during execution may be reduced. Hereinafter, how to make a notification based on a hardware interrupt will be described with reference to FIGS. 7 and 8 respectively.

Figure 7:
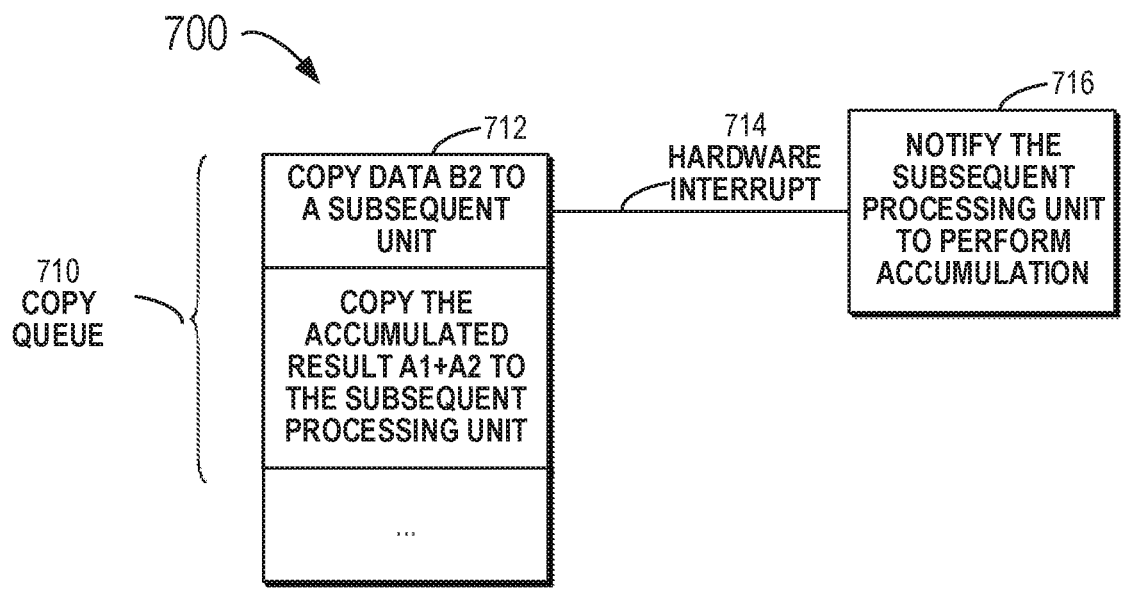
FIG. 7 schematically shows a block diagram of triggering a hardware interrupt after completing a copy operation in a copy queue according to example implementations of the present disclosure.

FIG. 7 schematically shows a block diagram 700 of triggering a hardware interrupt after completion of operations in a copy queue according to example implementations of the present disclosure. FIG. 7 shows a copy queue 710 for the processing unit 120. The copy queue 710 may include multiple copy operations. For example, a copy operation 712 in the copy queue 710 represents operation 1 in Table 1, i.e. copying data B2 at the processing unit 120 to the subsequent processing unit 130. As seen from the dependency relationship in Table 4, since this operation does not depend on other operations, it may be performed directly.

Further, based on the dependency relationship, the accumulation operation at the subsequent processing unit 130 depends on the copy operation 712. Thus, after completing the copy operation 712, a hardware interrupt 714 may be generated so as to notify 716 the subsequent processing unit 130 to perform a corresponding accumulation operation. At the subsequent processing unit 130, once the hardware interrupt 714 is received from the previous processing unit 120, an accumulation operation may be performed (i.e. received data B2 being accumulated with own data block B3).

According to example implementations of the present disclosure, a processing unit and a subsequent processing unit share a cache area, so an accumulated result may be copied from the processing unit to the cache area so as to realize a copy operation. For example, the processing unit 120 and the processing unit 130 may share a cache area, and in such case, the processing unit 120 may copy data to the cache area and the processing unit 130 may read data from the cache area. It will be understood although FIG. 7 only describes the example of generating the hardware interrupt 714 after performing one copy operation 712 in the copy queue 710, a subsequent processing unit may be notified in a similar way to perform a corresponding accumulation operation after other copy operations are performed.

Figure 8:
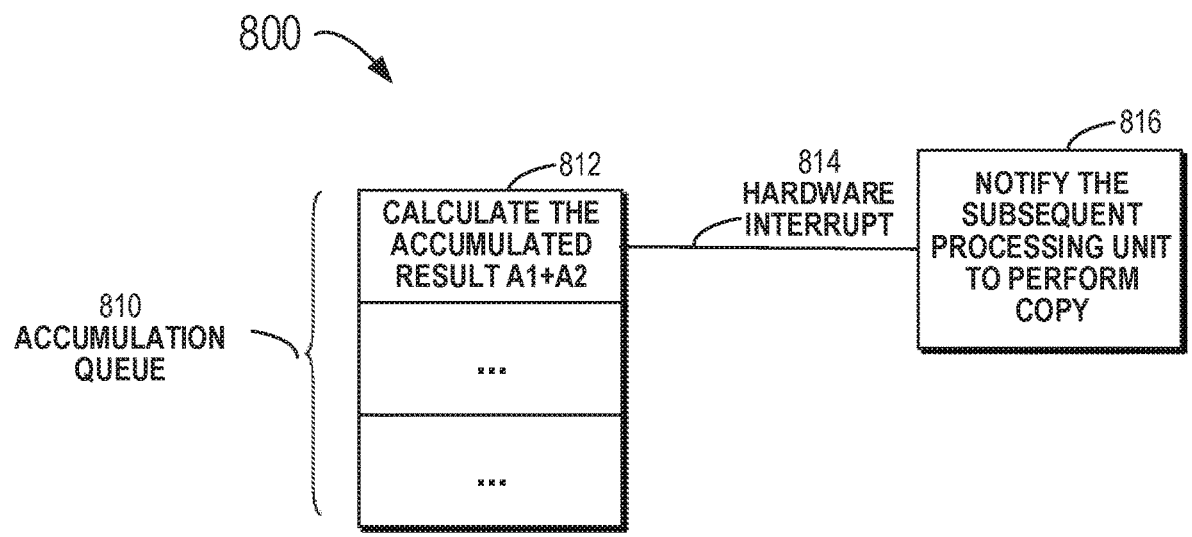
FIG. 8 schematically shows a block diagram of triggering a hardware interrupt after completing an accumulation operation in an accumulation queue according to example implementations of the present disclosure.

According to example implementations of the present disclosure, if an accumulation operation in the first queue has been performed at a processing unit, based on the hardware interrupt, a previous processing unit may be notified to perform a next copy operation in the second queue. A detailed description is presented below with reference to FIG. 8, which schematically shows a block diagram 800 of triggering a hardware interrupt after completing operations in an accumulation queue according to example implementations of the present disclosure. FIG. 8 shows an accumulation queue 810 for the processing unit 120, the accumulation queue 810 including multiple copy operations. An accumulation operation 812 in the accumulation queue 810 as shown in FIG. 8 represents operation 2 in Table 1, i.e. data A1 received from the processing unit 110 is accumulated with local data A2 so as to obtain an accumulated result (A1+A2). Since this operation depends on the previous processing unit 110 copying data A1 to the processing unit 120, the accumulation operation 812 may be initiated after the processing unit 120 receives the hardware interrupt from the processing unit 110.

Further, based on the dependency relationship of the accumulation operation 812, the copy operation of the previous processing unit 110 copying a subsequent accumulated result to the processing unit 120 will depend on the accumulation operation 812. Therefore, after completing the accumulation operation 812, a hardware interrupt 814 may be generated so as to notify 816 the previous processing unit 110 to copy the subsequent accumulation result to the processing unit 120. At the previous processing unit 110, once the hardware interrupt 814 is received from the processing unit 120, the processing unit 110 may perform a copy operation.

With example implementations of the present disclosure, since copy operations and accumulation operations use bandwidth resources and computing resources respectively, copy operations and accumulation operations to be performed are stored using a copy queue and an accumulation queue respectively. The two types of operations do not cause a resource conflict by using the copy queue and the accumulation queue, so the possibility of parallel execution may be increased. Further, as compared with technical solutions in which the host schedules the running of processing units or polling technology is used to constantly confirm whether the dependency relationship is satisfied, using a hardware interrupt to make a notification that the dependency relationship is satisfied may greatly improve the efficiency of scheduling operations and further improve the execution efficiency of a group of operations.

According to example implementations of the present disclosure, if it is determined all operations in the first queue and the second queue have been performed at the processing unit, then a message may be sent to indicate that the processing unit has processed a portion of the processing task. It will be understood although in example implementations of the present disclosure, the specific procedure of performing the processing task has been described in the context of only one processing unit, operations which are performed at other processing units among the multiple processing units are also similar. By performing the above method 300 at all of the multiple processing units in parallel, the efficiency that each processing unit performs the portion of processing task allocated to itself may be improved, so that the execution efficiency of the entire processing task may be improved.

Figure 9:
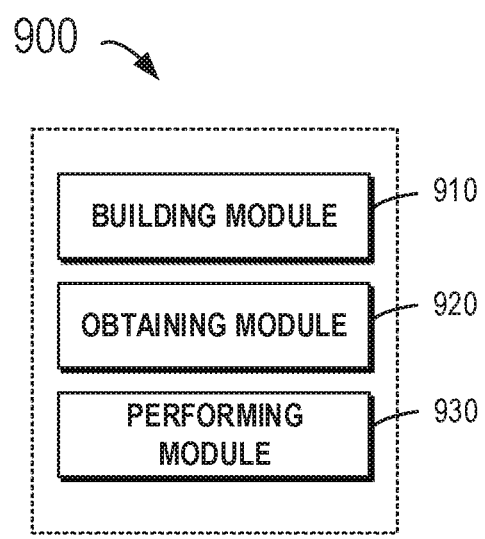
FIG. 9 schematically shows a block diagram of an apparatus for performing a processing task according to example implementations of the present disclosure.

Implementations of the method 300 for performing a processing task have been described in detail. According to example implementations of the present disclosure, there is further provided a device for performing a processing task. A detailed description is presented below with reference to FIG. 9, which schematically shows a block diagram of an apparatus 900 for performing a processing task according to example implementations of the present disclosure. One of a plurality of portions of the processing task includes a group of operations that are to be performed at one of a plurality of processing units, the group of operations including operations of a first type and operations of a second type. As shown in FIG. 9, the apparatus 900 includes: a building module 910 configured to build a first queue for performing operations of the first type and a second queue for performing operations of the second type; an obtaining module 920 configured to obtain, according to a definition of the processing task, a dependency relationship between a group of operations that are to be performed at the processing unit and a group of operations that are to be performed at other processing units among the plurality of processing units; and a performing module 930 configured to perform operations in the first queue and operations in the second queue respectively based on the dependency relationship.

According to example implementations of the present disclosure, the device further includes: a loading module configured to load to the processing unit first code for performing a first group of operations of the first type and second code for performing a second group of operations of the second type.

According to example implementations of the present disclosure, the performing module 930 includes: a first performing module configured to perform operations in the first queue based on the first code; and a second performing module configured to perform operations in the second queue based on the second code.

According to example implementations of the present disclosure, the device further includes: a retaining module configured to retain at least one of the first code and the second code in a memory of the processing unit.

According to example implementations of the present disclosure, the device further includes: a receiving module configured to receive, at the processing unit, a data block, which is to be processed at the processing unit, in to-be-processed data of the processing task, the data block resulting from dividing the to-be-processed data by the number of the plurality of processing units.

According to example implementations of the present disclosure, the performing module 930 further includes: a data processing module configured to perform, at the processing unit, operations in the first queue and operations in the second queue on the data block.

According to example implementations of the present disclosure, the processing task is an AllReduce task, and the plurality of processing units are connected in a ring.

According to example implementations of the present disclosure, the first group of operations include an accumulation operation for accumulating a data block at the processing unit to an accumulated result which is copied to the processing unit from a previous processing unit connected to and arranged before the processing unit, to form an accumulated result of the processing unit.

According to example implementations of the present disclosure, the second group of operations include a copy operation for copying an accumulated result at the processing unit to a subsequent processing unit connected to and arranged after the processing unit.

According to example implementations of the present disclosure, the performing module 930 includes: a notifying module configured to use a hardware interrupt of the processing unit to notify other processing units in response to completing an operation in any of the first queue and the second queue at the processing unit.

According to example implementations of the present disclosure, the notifying module includes: a first notifying module configured to notify the previous processing unit based on a hardware interrupt to perform a next copy operation in the second queue in response to completing an accumulation operation in the first queue at the processing unit.

According to example implementations of the present disclosure, the notifying module includes: a second notifying module configured to notify the subsequent processing unit based on the hardware interrupt to perform a next accumulation operation in the first queue in response to completing a copy operation in the second queue at the processing unit.

According to example implementations of the present disclosure, the processing unit and the subsequent processing unit share a cache area, and the device further includes: a copying module configured to copy at least one of the data block and the accumulated result from the processing unit to the cache area.

According to example implementations of the present disclosure, the device further includes: a reporting module configured to report that the processing unit has performed the portion of the processing task in response to determining that all operations in the first queue and the second queue have been performed at the processing unit.

Figure 10:
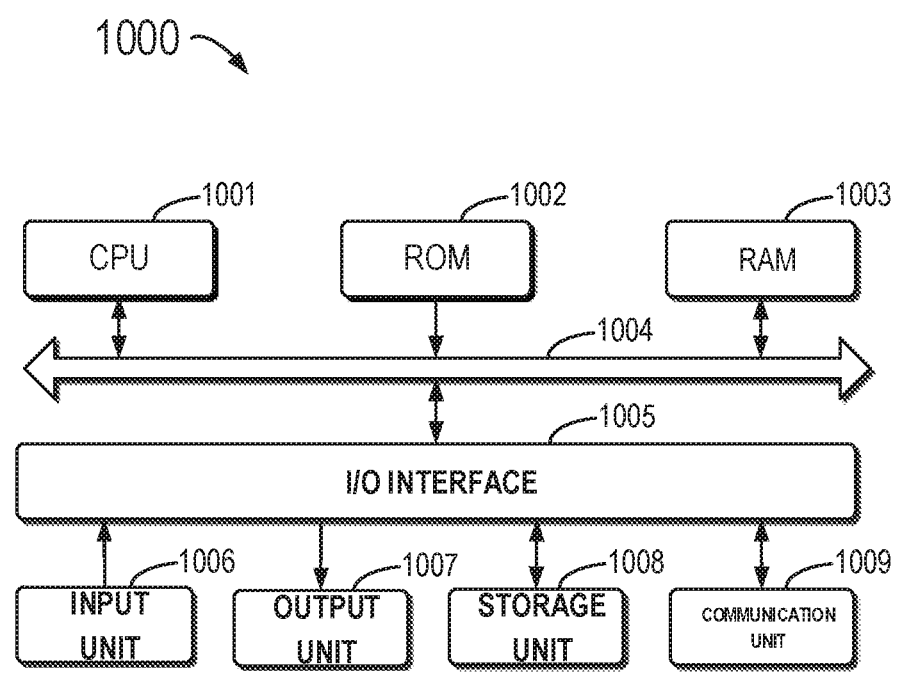
FIG. 10 shows a block diagram of a computing device which is applicable to implement a plurality of implementations of the present disclosure.

FIG. 10 shows a block diagram of a computing device 1000 which is applicable to implement multiple implementations of the present disclosure. The device 1000 may be used to implement the method described with reference to FIG. 3. As depicted, the device 1000 includes a central process unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 is connected to the I/O interface 1005, including: an input unit 1006, such as keyboard, mouse and the like; an output unit 1007, e.g., various kinds of display and loudspeakers etc.; a storage unit 1008, such as magnetic disk and optical disk etc.; and a communication unit 1009, such as network card, modem, wireless transceiver and the like. The communication unit 1009 allows the device 1000 to exchange information/data with other devices via the computer network, such as Internet, and/or various telecommunication networks.

The above described methods and processes, such as the method 300 are executed by the processing unit 1001. For example, in some implementations, the method 300 can be implemented as a computer software program tangibly included in the machine-readable medium, e.g., the storage unit 1008. In some implementations, the computer program can be partially or fully loaded and/or mounted to the device 1000 via ROM 1002 and/or the communication unit 1009. When the computer program is loaded to the RAM 1003 and executed by the CPU 1001, one or more steps of the above described method 300 can be implemented. Alternatively, in other implementations, the CPU 1001 may be configured in other suitable manners (for example, using a firmware) to perform the method 300.

According to example implementations of the present disclosure, there is provided a computer readable storage medium having a computer program stored thereon. The program, when executed by a processor, implements the method described in some embodiments of the present disclosure.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly executed on the machine, or used as a stand-alone software package to be partly executed on the machine and partly executed on a remote machine, or to be entirely executed on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A method for performing a processing task, a portion of a plurality of portions of the processing task comprising a group of operations that are to be performed at a processing unit of a plurality of processing units, the group of operations comprising operations of a first type and operations of a second type, the method comprising:

building a first queue for performing the operations of the first type and a second queue for performing the operations of the second type;

at the processing unit, receiving a data block, which is to be processed at the processing unit, in to-be-processed data of the processing task, the data block resulting from dividing the to-be-processed data by a number of the plurality of processing units;

obtaining, according to a definition of the processing task, a dependency relationship between a group of operations that are to be performed at the processing unit and a group of operations that are to be performed at other processing units among the plurality of processing units; and at the processing unit, performing operations in the first queue and operations in the second queue on the data block respectively at the processing unit based on the dependency relationship.

2. The method of claim 1, further comprising:

loading, to the processing unit, first code for performing a first group of operations of the first type and second code for performing a second group of operations of the second type; and wherein performing operations in the first queue and operations in the second queue respectively at the processing unit based on the dependency relationship comprises:

performing the operations in the first queue based on the first code; and performing the operations in the second queue based on the second code.

3. The method of claim 2, further comprising:

retaining at least one of the first code and the second code in a memory of the processing unit.

4. The method of claim 1, wherein:

the processing task is an AllReduce task, and the plurality of processing units are connected in a ring;

a first group of the operations of the first type comprise an accumulation operation for accumulating the data block at the processing unit to an accumulated result copied to the processing unit from a previous processing unit connected to and arranged before the processing unit, to form an accumulated result of the processing unit; and a second group of the operations of the second type comprise a copy operation for copying an accumulated result at the processing unit to a subsequent processing unit connected to and arranged after the processing unit.

5. The method of claim 4, wherein performing operations in the first queue and operations in the second queue respectively at the processing unit based on the dependency relationship comprises:

using a hardware interrupt of the processing unit to notify other processing units in response to completing an operation in any of the first queue and the second queue at the processing unit.

6. The method of claim 5, wherein using a hardware interrupt of the processing unit to notify other processing units in response to completing an operation in any of the first queue and the second queue at the processing unit comprises:

notifying the previous processing unit based on the hardware interrupt to perform a next copy operation in the second queue in response to completing an accumulation operation in the first queue at the processing unit.

7. The method of claim 5, wherein using a hardware interrupt of the processing unit to notify other processing units in response to completing an operation in any of the first queue and the second queue at the processing unit comprises:

notifying the subsequent processing unit based on the hardware interrupt to perform a next accumulation operation in the first queue in response to completing a copy operation in the second queue at the processing unit.

8. The method of claim 7, wherein the processing unit and the subsequent processing unit share a cache area, and performing the copy operation at the processing unit comprises: copying the accumulated result from the processing unit to the cache area.

9. The method of claim 1, further comprising:

reporting that the processing unit has performed the portion of the processing task in response to determining all operations in the first queue and the second queue have been performed at the processing unit.

10. An apparatus for performing a processing task, a portion of a plurality of portions of the processing task comprising a group of operations that are to be performed at a processing unit of a plurality of processing units, the group of operations comprising operations of a first type and operations of a second type, the apparatus comprising:

at least one processor; and a memory storing instructions, wherein the instructions when executed by the at least one processor, cause the at least one processor to perform operations, the operations comprising:

building a first queue for performing the operations of the first type and a second queue for performing the operations of the second type;

at the processing unit, receiving a data block, which is to be processed at the processing unit, in to-be-processed data of the processing task, the data block resulting from dividing the to-be-processed data by a number of the plurality of processing units;

obtaining, according to a definition of the processing task, a dependency relationship between a group of operations that are to be performed at the processing unit and a group of operations that are to be performed at other processing units among the plurality of processing units; and at the processing unit, performing operations in the first queue and operations in the second queue on the data block respectively at the processing unit based on the dependency relationship.

11. The apparatus of claim 10, wherein the operations further comprise:

loading to the processing unit first code for performing a first group of operations of the first type and second code for performing a second group of operations of the second type; and wherein performing operations in the first queue and operations in the second queue respectively at the processing unit based on the dependency relationship comprises:

performing the operations in the first queue based on the first code; and performing the operations in the second queue based on the second code.

12. The apparatus of claim 11, wherein the operations further comprise:

retaining at least one of the first code and the second code in a memory of the processing unit, respectively.

13. The apparatus of claim 10, wherein:

the processing task is an AllReduce task, and the plurality of processing units are connected in a ring;

a first group of the operations of the first type comprise an accumulation operation for accumulating the data block at the processing unit to an accumulated result copied to the processing unit from a previous processing unit connected to and arranged before the processing unit, to form an accumulated result of the processing unit; and a second group of the operations of the second type comprise a copy operation for copying an accumulated result at the processing unit to a subsequent processing unit connected to and arranged after the processing unit.

14. The apparatus of claim 13, wherein performing operations in the first queue and operations in the second queue respectively at the processing unit based on the dependency relationship comprises:

using a hardware interrupt of the processing unit to notify other processing units in response to completing an operation in any of the first queue and the second queue at the processing unit.

15. The apparatus of claim 14, wherein using a hardware interrupt of the processing unit to notify other processing units in response to completing an operation in any of the first queue and the second queue at the processing unit comprises:

notifying the previous processing unit based on the hardware interrupt to perform a next copy operation in the second queue in response to completing an accumulation operation in the first queue at the processing unit.

16. The apparatus of claim 14, wherein using a hardware interrupt of the processing unit to notify other processing units in response to completing an operation in any of the first queue and the second queue at the processing unit comprises:

notifying the subsequent processing unit based on the hardware interrupt to perform a next accumulation operation in the first queue in response to completing a copy operation in the second queue at the processing unit.

17. The apparatus of claim 16, wherein the processing unit and the subsequent processing unit share a cache area, and performing the copy operation at the processing unit comprises: copying the accumulated result from the processing unit to the cache area.

18. A non-transitory computer readable storage medium storing a computer program, the program, when executed by a processor, causes the processor to perform operations, the operations comprising:

building a first queue for performing operations of a first type and a second queue for performing operations of a second type, wherein a portion of a plurality of portions of a processing task comprising a group of operations that are to be performed at a processing unit of a plurality of processing units, the group of operations comprising operations of the first type and operations of the second type;

at the processing unit, receiving a data block, which is to be processed at the processing unit, in to-be-processed data of the processing task, the data block resulting from dividing the to-be-processed data by a number of the plurality of processing units;

obtaining, according to a definition of the processing task, a dependency relationship between a group of operations that are to be performed at the processing unit and a group of operations that are to be performed at other processing units among the plurality of processing units; and at the processing unit, performing operations in the first queue and operations in the second queue on the data block respectively at the processing unit based on the dependency relationship.

* * * * *